(12) United States Patent
Pryakhin et al.

(10) Patent No.: US 8,723,077 B2
(45) Date of Patent: May 13, 2014

(54) METHOD OF MARKING AN OBJECT TO IDENTIFY SAME

(76) Inventors: Evgeniy Ivanovich Pryakhin, St. Petersburg (RU); Ekaterina Vladimirovna Larionova, St. Petersburg (RU); Mikhail Grigor'evich Afon'kin, St. Petersburg (RU)

( * ) Notice: Subject to any disclaimer, the term of this patent is extended or adjusted under 35 U.S.C. 154(b) by 0 days.

(21) Appl. No.: 13/513,230

(22) PCT Filed: Jun. 27, 2011

(86) PCT No.: PCT/RU2011/000456
§ 371 (c)(1),
(2), (4) Date: Jun. 1, 2012

(87) PCT Pub. No.: WO2012/128659
PCT Pub. Date: Sep. 27, 2012

(65) Prior Publication Data
US 2014/0002565 A1    Jan. 2, 2014

(30) Foreign Application Priority Data

Mar. 24, 2011 (RU) ................................ 2011111052

(51) Int. Cl.
*B23K 26/00* (2014.01)
(52) U.S. Cl.
USPC .................................................... 219/121.69
(58) Field of Classification Search
USPC ............................. 219/121.6, 121.69, 121.85
See application file for complete search history.

(56) References Cited

U.S. PATENT DOCUMENTS

| 6,423,935 B1 | 7/2002 | Hackel et al. | |
|---|---|---|---|
| 8,196,807 B2 * | 6/2012 | Grimard | 219/121.85 |
| 2006/0196858 A1 * | 9/2006 | Barron et al. | 219/121.69 |
| 2012/0312792 A1 * | 12/2012 | Van de Sanden et al. | 219/121.69 |

FOREIGN PATENT DOCUMENTS

| RU | 2199781 C1 | 2/2003 |
|---|---|---|
| RU | 2216776 C2 | 11/2003 |
| RU | 2316049 C1 | 1/2008 |
| RU | 2365990 C1 | 8/2009 |
| WO | WO-02086052 A2 | 10/2002 |

* cited by examiner

*Primary Examiner* — Kristal Feggins
(74) *Attorney, Agent, or Firm* — Rader, Fishman & Grauer, PLLC

(57) ABSTRACT

A method of marking an object for identification purposes uses a local heating source, preferably a solid-state or fiber laser, to form a multi-symbol encoded encrypted monochrome or polychrome message with identification parameters of the object by impacting its surface. The message is created by modifying optical properties and structural configuration of the surface to create contrast microscopic imprints comprising cluster nanostructures of elements of the material of the surface. Encoding the message is based on a primary code array of correspondence of each of the message symbols to a multibit combination of 0 and 1 respectively representing absence and presence of the heating source impact imprint. Encrypting is effected by creating particular code arrays based on the primary one by means of random perturbation of its components. The invention makes it practically impossible to counterfeit the objects, replace them, or make a subject of others illegal actions.

20 Claims, No Drawings

METHOD OF MARKING AN OBJECT TO IDENTIFY SAME

CROSS-REFERENCE TO RELATED APPLICATIONS

This application is a continuation-in-part U.S. National phase application of the International application PCT/RU2011/000456, filed Jun. 27, 2011 claiming priority to Russian application 2011111052, filed Mar. 24, 2011, the entire contents of each of the applications being hereby incorporated into the present application by reference in full.

BACKGROUND OF THE INVENTION

1. Field of the Invention

The present invention relates to means for marking parts, products or assemblies produced industrially or made as a result of other business activity in order to verify the legality of their production and to identify such parts, products or assemblies when the occasion requires (in case of destruction of the products as they are used, etc.). The invention relates to marking parts, products or assemblies made of plastic, various hard inorganic materials such as metals, composites with metal and/or non-metal inclusions, glass ceramic, and other materials that are nontransparent for solid-state and fiber lasers.

The claimed method relates to means of products quality and/or turnover control and/or authenticity verification and/or movement supervision. Also, it relates to means of effective counteraction to unauthorized production and turnover of goods that are illegally produced. Obviated in the claimed method is the necessity of using nameplates, tags, marks and other legal production signs.

The present invention ensures the impossibility of counterfeit or substitution or other unauthorized actions in relation to the products that are marked in accordance with the proposed method.

2. Description of Related Art

Appearance of counterfeiting goods on the market required the development of means and technologies providing for unambiguous product authenticity identification. The problem of goods production accounting and movement control becomes as relevant as ever. One of the ways to solve this problem is to encode the required information and to apply it directly on the part or article surface.

Percussive, electrochemical, mechanical or color marking is used traditionally for metal article accounting and control. All these marking methods have a number of disadvantages such as negative effect for the article material, possible information loss during article exploitation or information falsification in case of the production of counterfeit goods. In addition, the prior art methods exclude the possibility of marking article by the mark (label), which can be then stably read by automation hardware, directly during the production process and thus prevent the problem of automated accounting from solving.

It should be emphasized that automated accounting is especially urgent for important manufacturing in metallurgy, engineering, power, automotive, and other industries.

As of now, bar coding has been in widespread use for automated accounting.

Bar codes help trace goods and thus allow time saving, efficiently responding to inquiries and reacting to any changes. Using bar codes makes information gathering and saving fast and precise and allows avoiding errors and simplifying goods turnover process.

Bar coding is a modern way of information input for various types of automation hardware like computers, cash registers, microprocessor controller, etc.

Typically, bar code is applied on an intermediate carrier, such as packaging, boxing, tags, documents, etc. Direct bar coding, especially in case of metal articles, is not used practically. Until recently, it has been caused by the lack of equipment for applying direct bar coding on the article material. With the development of laser marking, the real possibility to solve this problem came into being.

An ITF-type bar code developed especially for working with low printing quality seems to be most suitable due to its intrinsic enhanced reading reliability.

Apart from accounting, the article identification solves another important problem. Vendors can face baseless claims for warranty return of articles sold in fact by another vendor of similar articles. In order to prevent articles counterfeit said articles are provided with protection elements that are difficult to reproduce, or such reproduction will be prosecuted because of false marking or patent infringement.

There are several common article protection methods, such as holograms, packaging, bar code stickers, RFID technology, etc. DataDot (micro inscription) technology has been recently used for identification and counterfeit protection of the whole population of car spare parts. However, most protection technologies presume marking an intermediate carrier with more or less protected information instead of marking directly the metal surface. It decreases significantly article protection possibilities owing to the fact that protection element integrity is not guaranteed as opposed to applying the marking onto the surface of an article.

A method of marking article or product or assembly to identify same, and an identification system to identify the article or product or assembly marked according to the method are described in the Russian Federation patent 2199781. This group of inventions relates to means of marking all types of articles, products and assemblies produced industrially or made as a result of other business activities and adapted for the production legality verification. Using the inventions results in practical impossibility of counterfeiting or replacement or other illegal actions in respect of above mentioned goods. The method and system provide marking goods with data containing encoded information or digital signature applied to the goods or a label thereon or other information medium. The data may also be stored in storage device that said goods may be provided with. Authenticity verification is made by means of an identification unit adapted to transform the stored data into messages which are then checked using cryptographic algorithms, any interested user being able to review the verification result. The method of, and system for, marking product, article or assembly relate to the means aimed at product, article or assembly quality and/or turnover control and/or authenticity verification and/or movement supervision. The method and system relate also to means which are designated for effective countermeasures to be taken against unauthorized reproduction or flow of goods, articles or assemblies and which can be used for the production of nameplates, tags, marks, tickets and other legal production signs of said product, article or assembly. The group of inventions ensures that counterfeit, replacement or other unauthorized actions against product, article or assembly marked by means of the claimed method and with the use of the system implementing same are practically impossible.

A method of counterfeit protection of quantity-produced goods is disclosed in Russian Federation patent 2365990 "Product authenticity verification method". The method consists in applying a label with an identification code on the product, said code being an alphanumeric set which is generated by a random number generator. The identification code is covered by an opaque erasable covering. The opaque covering should be erased and the product identification code should be read and transmitted by telecommunication means to a supervisory service in order to verify product authenticity after product is bought. The supervisory service compares the received product identification code with identification codes stored in a database.

The identification code is assigned an open number that corresponds to the number of identification codes package, as a part of which the identification code is stored in the supervisory service database. The open number is applied near or on the opaque erasable covering of the identification number. This open number is used by the manufacturer to activate product protection by sending (to a phone number or Internet address) the identification code number and manufacturer password via telecommunication means to the supervisory service, and by storing the protected product information in the identification code database at the supervisory service. The invention simplifies marking the protected products and increases the products counterfeit protection level.

The technical result of the invention consists in the counterfeit protection level increase and in the simplification of the identification codes generation process and marking the goods being protected against counterfeit. The simplification is achieved due to the fact that the manufacturer does not take part in the identification code generation process and therefore the claimed method is easier to use by a wide range of bona fide manufacturers.

Russian Federation patent 2216776 "Method of, and system for, labeled objects identification and accounting" refers to methods and apparatuses used for objects automated accounting and movement control in the course of business activity. The technical result of the invention lies in the increase of validity in accounting a labeled objects array. The method consists in labeling each object with a protected identification sign with an object identifier (ID) applied thereon and controlling objects movement for each business entity according to information which is registered in a database. The object ID is a multi-symbol combination randomly selected from an array of unrepeatable multi-symbol combinations. Any person has an access to the database in order to receive information by means of the object ID about the object origin and the business entity from which the object is obtained. The object of the group of inventions is to provide a system of labeled objects array accounting in the course of production, distribution and using thereof. The technical result of the first invention of the group lies in the increase of validity in accounting marked objects array. The first invention is a method of accounting objects of business activity which comprises marking each object with the protected identification sign, the object ID being applied thereon, and controlling objects movement (goods flow) for each business entity according to information which is registered in the database. The second invention in the group enhances the resources of the marked objects automated identification and accounting system. The second invention is a marked objects identification and accounting system which comprises means for generation identification signs with the ID, means for applying the signs on the objects, means for controlling movement of marked objects, the control means containing at least one point for inputting data about the objects and IDs, data input devices and information processing means containing a comparator and a decision-making device, the means for generation, applying, and controlling and devices being connected by telecommunication channels.

Russian Federation patent 2316049 "Method of labeling goods" discloses marking articles for counterfeit and copying protection. The method comprises forming a visually distinguishable graphical image of an alphanumeric picture, the image being a dotted dimples collection made by impact penetration of an instrument into the article surface. Some dotted dimples are made deeper than the others dimples in the collection. To form the graphical image of the alphanumeric picture, the impacts on the article surface are hit successively one after another by a needle of a program controlled automatic impact machine Needle impact power is set independently for each dotted dimple in order to make the depth difference between particular dotted dimples distinguishable only with optical means that have influence on human eye resolution. Thus, the method provides marking having an increased level of article protection due to the fact that the hidden marking is inaccessible for a third-party observer. Also, the method provides for the increase of validity confirmation of the article authenticity and marking productivity increase in mass production.

The U.S. Pat. No. 6,423,935 "Identification marking by means of laser peening" discloses a method and apparatus for marking components by inducing a shock wave on the surface that results in an indented (strained) layer and a residual compressive stress in the surface layer. The marked component can be a metal or plastic article.

In the international application WO 2002/086052 "Surface labeled object and method thereof," a method for labeling the durable surface of an object for its identification is described. This method includes the use of 'pit and fall' (i.e., holes and bumps used to record compact discs, CD-ROMs) technology to encode durable surface objects with coded messages. The coded message can be information on the owner, a history of the object, or any other information desired. The coded message would not be detectable by means of a laser scanning rather than by to the human eye.

The above mentioned patent publications disclose neither the possibility of exploitation of the article labeled with the prior art methods nor its identification in case of emergency, destruction etc.

The method disclosed in the international application WO 2002/086052 was chosen by the authors of the present invention as the prototype, as being the closest to the present invention as far as the aggregation of the essential features used is concerned. One of the aspects of the prototype is a method of marking the surface of an object for its identification. The object has a durable surface or a durable surface tag affixed to the object. For present purposes, the term "durable" means a surface whose characteristics are such that it can retain the mark applied thereto. Thus, the surface may be rigid or flexible, so long as the surface retains the mark during the use of the object. The method includes the use of "pit and fall" or "pit and land" (i.e., holes and bumps as are used to record compact discs, CD-ROMs) technology to apply a coded message onto the surface of an object. The coded message can be information on the owner, a history of the object, or any other information desired. A conventional reading laser is used to read the label (mark) on the durable surface. When reading the coded message, a laser beam having a fixed wavelength (say, 780 nm) is directed onto durable surface. The method for labeling an object for its identification comprises the steps of forming a pit and land coded message on a durable surface selected from one or more of a surface of the object or a tag which is attached to said object, overcoating the coded message with a coating, which comprises capsules formed from an encapsulant which encapsulates a biologic marker, which are labeled with an agent that emits selected detectable wavelengths of energy when exposed to infrared radiation (IR), the capsules being dispersed in a film-forming vehicle.

The prior art method does not determine the way of applying the mark on the article surface. Depending on the method the mark is applied, the properties of the surface of the article can change significantly, which can make the article impossible to use. For example, surface defects are not allowed in case of turbine blades because of possible blade destruction. In addition, the necessity of applying the coating comprising a sealant with a biological marker would negate the possibility of using the method for articles working in corrosive medium, high temperature and similar conditions of the use.

BRIEF SUMMARY OF THE INVENTION

The object of the present invention is to provide a method of marking articles with such a level of protection against counterfeit and of controlling authenticity of the articles that, with a minimal cost of implementation thereof, would allow for top-quality protection against counterfeit, for making it impossible the repeated use of the articles whose life time has been exhausted, for making it possible to identify the articles in critical situations (destruction, failure, etc.), for retaining information properties of the articles under operating conditions including those with high temperature and pressure conditions, corrosive mediums, electromagnetic or radiation fields, etc. The method of the present invention is implemented by applying an encoded message comprising identification information.

In accordance with the present invention, a method of marking an object to identify the same comprises forming an encoded and encrypted symbol message on a surface of the object made of metal, polymer, inorganic material, and other materials that are nontransparent for solid-state and fiber lasers.

As this takes place, applying the encoded message is performed with the use of a local heating source that changes optical properties and structural configuration of the surface with the formation of contrast microscopic imprints of cluster nanostructures of the elements being a part of the object material composition.

Encoding is based on the use of a primary code array where each symbol corresponds to a multibit combination of zeros and ones, the ones representing the presence and the zeros representing the absence of an imprint of the local heating source impact.

Encrypting symbols in the encoded message is performed by creating particular code arrays from the primary code array by means of random perturbation of the components thereof.

Applying the encoded message by a local heating source on the object surface is computer controlled and performed in accordance with predetermined parameters, the parameters being computed according to the following ratios:

$$F = \frac{\alpha\beta}{2t_x} + \sqrt{\frac{\alpha^2\beta^2}{4t_x^2} - \frac{\alpha\beta\gamma}{t_x r^2}}, V = \lambda F,$$

where $\alpha = \frac{2Q_{ep}}{\pi r^2 \sqrt{\tau\pi}}$ – a parameter of the laser facility, $\beta = \frac{\eta\sqrt{\gamma}}{K}$ – a parameter of the material being processed;

F—laser pulse repetition frequency, Hz;

V—laser beam travel speed, m/s;

Qcp—average laser radiation power, W;

r—laser beam imprint radius on the material surface, m;

τ—laser pulse duration, s;

η—processed material absorption coefficient;

γ—processed material thermal diffusivity, m²/s;

λ—produced color wavelength, m;

K—material thermal conductivity, W/(m·degree);

$t_x$—phase transition temperature of the object material, ° C.

The encoded message can comprise data about the object, including parameters of the object and data about a manufacturer thereof.

The encoding parameters can include optical properties of the imprint.

The local heating source can include a solid state or fiber laser for marking metal, plastic, or polymer materials.

Applying the encoded message onto the surface of the object can be performed in the absence of coloring or varnishing agents or chemical reagents.

The encoded message can additionally comprise a bar code or a visible color logo.

DETAILED DESCRIPTION OF THE INVENTION

The present invention is based on the ability of materials (metals, polymers, and various inorganic materials) to form precision round craters of nanocluster structure on the surface of an article when treated by laser pulses, the craters having optical properties, primarily reflectivity, fundamentally differing from those of untreated surface. Formed after the laser treatment is a contrast image visible under the microscope and comprising dark dots resulted from the laser action and white fields where no laser action occurred.

In the present invention, a method of marking objects is realized by forming on the object itself an encoded message containing identification information. The way the information is encoded is based on the principle of forming encoding system of a "0" and "1" set, the "1" indicating the presence of the laser beam imprint, and the "0" indicating the absence of the laser beam imprint. Any bit information containing Roman alphabet symbols, digits, punctuation symbols, national fonts, character graphics, and so on can be thus encoded, the information being a general symbol array. Any symbol of the encoding array may be represented by a multi-bit combination of 0 and 1. In case of using an eight-bit system of coding symbols, the combinations would look as follows: 00000000, 00000001, 00000010, and so on.

When applying a symbol by a point local heat source, the size of the field affected is 50×8=400 μm in width and 50 μm in height at the imprint diameter of 50 μm, a text page of 30 lines, 80 symbols per line taking area of 32×1.5 mm. An example of applying symbols is illustrated by Table 1.

TABLE 1

| Characters | | | | Encoding |
|---|---|---|---|---|
| М | а | М | а | • • • • • • • • • • • • • • • • • • • • • • |
| М | ы | Л | а | • • • • • • • • • • • • • • • • • • • • • • |
| р | а | М | у | • • • • • • • • • • • • • • • • • • • • • • |

Any information like text, graphic, sound or other, may be represented in characters.

The important feature of the present invention is a first proposed inventive system of encryption of encoded information. The essence of the system lies in encrypting the information, which is intended to be written on the surface of the object in an encoded message, by means of creating particular symbol arrays from the general symbol array. A particular symbol array makes the initial general symbol array whose components are randomly shuffled. A possible quantity of such particular symbol arrays exceeds $8 \times 10^{506}$ in case of 8-bits encoding system, which makes it impossible for all practical purposes for a user to read encrypted information applied on the surface of the object without having the particular symbol array. Examples of some particular arrays are given in Table 2.

TABLE 2

| 8-bit encoding system | First particular array | Second particular array | ... | N-particular array |
|---|---|---|---|---|
| 00000000 | 3 | 5 | | о |
| 00000001 | Г | Н | | о |
| 00000010 | Ъ | | | Є |
| 00000011 | F | ... | | d |
| 00000100 | c | X | | — |
| 00000101 | Ё | G | | |
| 00000110 | y | 1 | | y |
| 00000111 | 4 | t | | 3 |
| 00001000 | Д | Ѓ | | < |
| 00001001 | | ‰ | | 2 |
| 00001010 | Е | 3 | | Ѣ |
| 00001011 | Ы | { | | ° |
| 00001100 | * | x | | |
| 10001101 | ± | ] | | Ы |
| 00001110 | s | ! | | † |
| 00001111 | ¶ | | | | © |
| 00010000 | > | ( | | B |
| 00010001 | p | Ю | | [ |
| 00010010 | ' | V | | э |
| 00010011 | ] | b | | Ы |
| 00010100 | | @ | | |
| 00010101 | | | | |
| 00010110 | \ | | | Z |
| 00010111 | ,, | 6 | | ‡ |
| 00011000 | ё | | | n |
| 00011001 | ќ | Л | | |
| 00011010 | † | 2 | | N |
| 00011011 | | , | | s |
| 00011100 | Љ | § | | 9 |
| 00011101 | B | Я | | , |
| 00011110 | S | 7 | | , |
| 00011111 | | | | |
| 00100000 | e | & | | |
| 00100001 | ' | x | | ¤ |
| 00100010 | \| | | | ( |
| 00100011 | 1 | ° | | П |
| 00100100 | , | c | | ± |
| 00100101 | ж | ™ | | Г |
| 00100110 | ; | J | | Щ |
| 00100111 | Ѓ | u | | Њ |
| 00101000 | Њ | ч | | |
| 00101001 | к | | | J |
| 00101010 | a | w | | { |
| 00101011 | J | B | | • |

TABLE 2-continued

| 8-bit encoding system | First particular array | Second particular array | ... | N-particular array |
|---|---|---|---|---|
| 00101100 | b | \ | | < |
| 00101101 | э | й | | m |
| 00101110 | ў | T | | Д |
| 00101111 | ? | ъ | | Ц |
| 00110000 | = | | | 1 |
| 00110001 | 8 | ¶ | | Д |
| 00110010 | r | Ш | | S |
| 00110011 | " | $ | | 7 |
| 00110100 | + | | | Ф |
| 00110101 | T | C | | |
| 00110110 | % | Ъ | | 3 |
| 00110111 | W | | | |
| 00111000 | u | s | | — |
| 00111001 | 5 | , | | |
| 00111010 | D | a | | |
| 00111011 | 2 | Ѓ | | j |
| 00111100 | α | , | | |
| 00111101 | | Ы | | r |
| 00111110 | ® | 8 | | Ъ |
| 00111111 | G | p | | , |
| 01000000 | ќ | Ц | | Q |
| 01000001 | № | — | | ¬ |
| 01000010 | x | Г | | ё |
| 01000011 | 1 | Ï | | X |
| 01000100 | o | ? | | Є |
| 01000101 | Ѓ | B | | |
| 01000110 | Ю | , | | ‰ |
| 01000111 | o | Љ | | ц |
| 01001000 | | 4 | | b |
| 01001001 | # | M | | |
| 01001010 | H | O | | H |
| 01001011 | " | | | + |
| 01001100 | y | q | | Y |
| 01001101 | q | o | | § |
| 01001110 | T | } | | ¶ |
| 01001111 | K | < | | |
| 01010000 | y | s | | k |
| 01010001 | g | ± | | g |
| 01010010 | | | | Ш |
| 01010011 | | ¬ | | ™ |
| 01010100 | Ъ | ў | | A |
| 01010101 | k | ў | | E |
| 01010110 | ï | — | | |
| 01010111 | | э | | x |
| 01011000 | Г | | | O |
| 01011001 | ф | | | |
| 01011010 | 7 | Y | | M |
| 01011011 | X | K | | i |
| 01011100 | Ï | p | | 3 |
| 01011101 | p | * | | ! |
| 01011110 | ) | < | | |
| 01011111 | / | | | \| |
| 01100000 | i | 3 | | r |
| 01100001 | B | » | | h |
| 01100010 | A | Є | | и |
| 01100011 | | Я | | ' |
| 01100100 | | | | * |
| 01100101 | I | — | | ю |
| 01100110 | | ‡ | | p |
| 01100111 | © | % | | » |
| 01101000 | П | f | | Ц |
| 01101001 | _ | i | | . |
| 01101010 | > | . | | Ъ |
| 01101011 | ~ | э | | |
| 01101100 | S | Г | | > |

TABLE 2-continued

| 8-bit encoding system | First particular array | Second particular array | ... | N-particular array |
|---|---|---|---|---|
| 01101101 | Њ | A | | Я |
| 01101110 | h | U | | ђ |
| 01101111 | ђ | z | | p |
| 01110000 | | ћ | | Њ |
| 01110001 | Ч | o | | = |
| 01110010 | @ | | | w |
| 01110011 | δ | n | | δ |
| 01110100 | a | й | | \| |
| 01110101 | Ц | и | | u |
| 01110110 | | S | | M |
| 01110111 | v | > | | y |
| 01111000 | | 9 | | e |
| 01111001 | ћ | | | — |
| 01111010 | — | | | № |
| 01111011 | 3 | R | | 4 |
| 01111100 | | и | | I |
| 01111101 | ' | — | | ? |
| 01111110 | N | К | | Ї |
| 01111111 | ю | E | | a |
| 10000000 | w | N | | Б |
| 10000001 | | | | ] |
| 10000010 | I | i | | |
| 10000011 | t | Г | | |
| 10000100 | d | Ћ | | |
| 10000101 | ™ | l | | Ґ |
| 10000110 | T | I | | ї |
| 10000111 | и | = | | E |
| 10001000 | [ | D | | ) |
| 10001001 | и | [ | | J |
| 10001010 | c | Ђ | | s |
| 10001011 | & | > | | P |
| 10001100 | M | Ж | | R |
| 10001101 | Ъ | | | Ш |
| 10001110 | s | Ж | | |
| 10001111 | ° | Њ | | @ |
| 10010000 | | r | | H |
| 10010001 | ( | e | | } |
| 10010010 | $ | H | | Й |
| 10010011 | | Љ | | & |
| 10010100 | m | © | | с |
| 10010101 | P | d | | ќ |
| 10010110 | >> | F | | ў |
| 10010111 | | \| | | |
| 10011000 | | / | | \ |
| 10011001 | Ѓ | ю | | \ |
| 10011010 | A | 3 | | Љ |
| 10011011 | M | | | S |
| 10011100 | Д | к | | |
| 10011101 | | — | | |
| 10011110 | V | << | | Џ |
| 10011111 | Љ | Є | | й |
| 10100000 | H | П | | D |
| 10100001 | E | | | „ |
| 10100010 | Ф | Ч | | и |
| 10100011 | Ш | O | | ‘ |
| 10100100 | Ґ | ф | | B |
| 10100101 | ц | a | | Ё |
| 10100110 | Б | j | | ^ |
| 10100111 | μ | | | i |
| 10101000 | } | j | | $ |
| 10101001 | Є | | | |
| 10101010 | Џ | ' | | |
| 10101011 | | I | | |
| 10101100 | Л | P | | B |
| 10101101 | — | | | e |
| 10101110 | | | | Ж |
| 10101111 | X | Л | | # |
| 10110000 | U | m | | 6 |
| 10110001 | " | X | | T |
| 10110010 | | Щ | | П |
| 10110011 | | y | | t |
| 10110100 | e | W | | ... |
| 10110101 | | | | Э |
| 10110110 | ' | A | | % |
| 10110111 | Z | Њ | | V |
| 10111000 | Є | g | | q |
| 10111001 | x | h | | C |
| 10111010 | 0 | Q | | я |
| 10111011 | ¬ | ¤ | | |
| 10111100 | f | ђ | | |
| 10111101 | H | v | | 5 |
| 10111110 | П | | | y |
| 10111111 | , | S | | μ |
| 11000000 | R | ' | | — |
| 11000001 | | T | | T |
| 11000010 | 9 | ) | | ў |
| 11000011 | O | C | | |
| 11000100 | Щ | Ь | | f |
| 11000101 | << | M | | U |
| 11000110 | Ћ | | | 8 |
| 11000111 | Q | : | | v |
| 11001000 | Q | є | | Л |
| 11001001 | ^ | ї | | l |
| 11001010 | B | # | | Ґ |
| 11001011 | я | | | ' |
| 11001100 | Ћ | | | K |
| 11001101 | Л | Ф | | |
| 11001110 | Ў | y | | Ќ |
| 11001111 | P | P | | G |
| 11010000 | | Ы | | c |
| 11010001 | | + | | / |
| 11010010 | — | Ш | | |
| 11010011 | я | k | | P |
| 11010100 | Э | ~ | | ' |
| 11010101 | \| | Щ | | ќ |
| 11010110 | Ы | † | | H |
| 11010111 | ‰ | Ц | | Л |
| 11011000 | ‡ | μ | | : |
| 11011001 | : | „ | | ь |
| 11011010 | Щ | δ | | Ч |
| 11011011 | є | Д | | " |
| 11011100 | § | П | | T |
| 11011101 | Ш | H | | j |
| 11011110 | й | Б | | Ю |
| 11011111 | 6 | y | | C |
| 11100000 | < | № | | L |
| 11100001 | O | ё | | Ч |
| 11100010 | Ч | J | | << |
| 11100011 | | Д | | Ђ |
| 11100100 | , | " | | Ѓ |
| 11100101 | j | E | | h |
| 11100110 | J | ; | | " |
| 11100111 | L | " | | є |
| 11101000 | Ђ | ' | | Љ |
| 11101001 | M | | | x |
| 11101010 | · | M | | X |
| 11101011 | J | L | | M |
| 11101100 | ! | | | ; |
| 11101101 | — | | | к |
| 11101110 | C | | | Ћ |
| 11101111 | К | Џ | | " |
| 11110000 | Џ | B | | W |
| 11110001 | | ^ | | Щ |
| 11110010 | • | 0 | | Ж |
| 11110011 | n | " | | A |
| 11110100 | C | e | | O |
| 11110101 | Ж | Ќ | | ф |
| 11110110 | < | ї | | ® |
| 11110111 | i | Z | | |
| 11111000 | | Ё | | z |
| 11111001 | z | ќ | | > |
| 11111010 | й | ц | | a |
| 11111011 | | T | | Ѓ |
| 11111100 | | Ь | | ~ |
| 11111101 | 3 | ® | | I |
| 11111110 | { | • | | 0 |
| 11111111 | Y | c | | F |

Special software is used to prepare prepares the identification information to be then laser-applied on the surface of the object.

Written in the encoded message can be information concerning the article, like technological data (material grade and composition, critical parameters, extreme conditions, etc.), manufacturer's data, production date, etc. The volume of information which is written in the information field is defined only by the area size allocated for the information field. For example, 5 pages of typescript (1 page of 30 lines, 80 symbols per line) can take the area of 32×7.5 mm at the imprint diameter of 50 μm.

Any industrial solid-state or fiber laser such as BetaMarker, DioMarker 10, D'Mark 06, Mini Marker M10, Mini Marker M20 or any other suitable for processing metal, polymer, and inorganic materials can be used for applying the identification information in accordance with the present method.

To enhance protective and identification properties of the encoded message, it can additionally contain a color or holographic image in the form of a logo, an emblem, a manufacturer's brand, or other distinctive image or a bar-code. Such image is formed owing to clustering a surface structure of the material and forming surface nanosystems with different optical and physical properties. The encoded message is formed as a visible imprint being applied onto the surface of the object. No coloring agents, varnishing compositions or other chemical agents are employed for object surface treatment. Thus, using a system based on presence (1) or absence (0) of the imprint of the local heating source impact for encoding the applied information with maximum compression becomes feasible.

The process of forming the encoded message by a local heating source on the object surface is computer controlled and based on predetermined parameters, the parameters complying with the following ratios:

$$F = \frac{\alpha\beta}{2t_x} + \sqrt{\frac{\alpha^2\beta^2}{4t_x^2} - \frac{\alpha\beta\gamma}{t_x r^2}}, V = \lambda F,$$

where $\alpha = \frac{2Q_{cp}}{\pi r^2 \sqrt{\tau\pi}}$ – a laser facility parameter, $\beta = \frac{\eta\sqrt{\gamma}}{K}$ – a processed material parameter;

F—laser pulse repetition frequency, Hz;
V—laser beam travel speed, m/s;
Qcp—medium laser radiation power, W;
r—laser beam imprint radius on the material surface, m;
τ—laser pulse duration, s;
η—processed material absorption coefficient;
γ—processed material thermal diffusivity, m²/s;
λ—produced color wavelength, m;
K—material thermal conductivity, W/(m·degree);
$t_x$—phase transition temperature of the object material, ° C.

The method according to the present invention can be further characterized by following features:
  including an unlimited volume (plenitude) of information concerning the object, such as technological data (material grade and composition, critical parameters, extreme conditions of using, etc.), manufacturer's data, production date, etc. in the encoded message;
  using imprint optical properties as an encoding parameter;
  using an industrial solid-state or fiber laser as the local heating source;
  including a bar-code and/or visible color logo into the encoded message.

Technical-and-Economic Effect.

The present method of marking an object to identify the same complies fully to all protection requirements. Expenses to counterfeit such marking would significantly exceed the cost of the mark due to having to include not only expenses for high-priced equipment but also development of at least two types of technologies as well. Also, good use of the multi-level protection approach is made in the invention. At least 7 qualified distinctions between a genuine mark and a counterfeit could be revealed during expertise. The developed technology makes it possible to produce a color or holographic logo, which is a part of the encoded message, the message having high durability against exploitation wear because of the formation of the cluster structures (excepting cases of the destruction of labeled objects through the depth of the laser treatment). These special features relate to the whole applied encoded message identification, because its elimination is possible only in case of article destruction to the depth of the laser treatment.

The encoded message is characterized by the following properties:
  Ability to write a large volume of information on a small surface area of the mark.
  Ability of storing the information in the message during the whole article (object) life cycle, which makes it possible to identify the article in case of destruction, emergencies, etc.
  Preserving the ability of articles with such messages to work under extreme conditions—high temperatures, high pressure, corrosive mediums, electromagnetic or radiation fields, etc.
  Tolerance to electromagnetic pulses and interferences.
  Absence of having to bring a reading unit into a contact with the information field.
  High speed of data reading and conversion into text symbols.
  Ability to use labeled articles in severe climatic conditions and hazardous environment.
  Information protection ability. The encryption method provides the possibility to create $8 \times 10^{506}$ of code tables.
  Absolute protection against viruses.
  High information counterfeit immunity for the production of infringing goods.

To a first approximation, the prospects of sufficiently short recoupment period, return on investments, and profit earning could be achieved in the following branches of industry:

1. Automotive industry. The use of the identification mark significantly increases spare parts and vehicle protection rate. Thus, losses in this industry could be decreased by 10 billion RUR per year due to the sharp decrease (by 70-80% approximately) of thefts of vehicles and spare parts (based on Rosstat data for 2007). The aggregated economic effect value can be calculated as follows:

For the first six months of 2007, claimed for search in Russia were 52,701 stolen vehicles. For the year as a whole, the number of stolen vehicles exceeded 100 thousand. Taking into account the average vehicle value of about $8,000 and average percent of stolen vehicles restitution (30%), the approximate economy resulted from carjack 70% decrease would be:

100,000 vehicles×0.7(stolen vehicles restitution)×$8,000×30 (RUR rate for $)×0.7(carjack decrease)=11,760,000,000 RUR., i.e. more than 11 billion RUR per year. In addition, it will have economic and social effect for vehicle owners.

2. Railroad Transport

The use of protected and easy to read out railway rolling equipment IDs will allow not only to straighten things out and provide for the equipment accounting unification, but to bring about the ability to track the traveling of each car over the country and react timely on abnormal idle time as well, to thus eventually increase the railroad traffic speed by at least 1.5-2% per year. In turn, each percent gained in the railroad traffic speed increase results in significant economy due to acceleration of the nation's total capital turnover. It is difficult to precisely calculate this economy rate, but the lowest-end probability estimate of the effect could amount to several billion RUR.

3. Marking any metal hardware, including that having painted surfaces, with the identification mark and using simple means to verify marker authenticity could drastically decrease sale and production of infringing goods, including household appliances, vehicles and airplanes spare parts, etc. It would result not only in increasing articles reliability, but in taking out production of those articles from the shadow turnover as well.

According to official statistics, market share of infringing goods on the Russian market amounts to 40%. On the other side, according to independent experts, the grey market share is up to 60% of retail in Russia. Infringing goods sales and production share is up to 30% of gross domestic product in Russia. At a conservative estimate, decreasing the grey economy segment volume by 20% in only, for example, the production of vehicle spare parts, whose turnover in Russia amounts to about 10 billion RUR, can increase budget receipts by 500 million RUR per year.

In respect to all metal hardware production, similar economic effect would reach billions of RUR, the economic effect being felt by both the owners of famous brands and the state, thanks to the substantial expansion of output of legal metal hardware resulting in additional fiscal revenue due to taxable base increase, and additional pension and social insurance fund income. Additional effect resulted from vehicles and household appliances accident rate decrease is hardly to calculate, but most likely it will amount to billions of RUR per year.

What is claimed is:

1. A method of marking an object to identify same comprising:
   providing a local heating source and
   forming a multi-symbol encoded encrypted message with identification parameters of the object to apply same on a surface of the object impacting the surface by the local heating source,
   said forming being performed by modifying optical properties and structural configuration of the surface to thereby create contrast microscopic imprints thereon comprising cluster nanostructures of elements of material the surface of the object is made of, and
   encoding the encoded encrypted message being performed based on a primary code array of correspondence of each of the symbols of the encoded message to a multibit combination of 0 and 1, the 0 and 1 representing absence and presence of the local heating source impact imprint; and
   encrypting the encoded encrypted message being effected by creating particular code arrays based on the primary code array by means of random perturbation of the components thereof.

2. The method of claim 1 wherein said forming is computer controlled and carried out according to predetermined impact parameters, the impact parameters being determined as follows:

$$F = \frac{\alpha\beta}{2t_x} + \sqrt{\frac{\alpha^2\beta^2}{4t_x^2} - \frac{\alpha\beta\gamma}{t_x r^2}}, V = \lambda F,$$

where $\alpha = \frac{2Q_{ep}}{\pi r^2 \sqrt{\tau\pi}}$ – local heating source facility parameter, $\beta = \frac{\eta\sqrt{\gamma}}{K}$ – processed material parameter;

F—local heating source pulse repetition frequency, Hz;
V—local heating source beam travel speed m/s;
Qcp—medium local heating source radiation power W;
r—local heating source beam imprint radius on the material surface, m;
$\iota$—local heating source pulse duration, s;
η—material absorption coefficient;
γ—material thermal diffusivity, $M^2/s$;
λ—produced color wavelength, m;
K—material thermal conductivity, (W/(m·degree));
$t_x$—phase transition temperature of the object material, °C.

3. The method of claim 1 wherein the encoded encrypted message contains identification information concerning the object, such as technological data (material grade and composition, critical parameters, extreme maintenance conditions etc.), manufacturer's data, production date, etc.

4. The method of claim 1 wherein the identification parameters comprise optical properties of the imprint.

5. The method of claim 1 wherein the local heating source includes a solid-state or fiber laser for marking metals, inorganic and polymer materials.

6. The method of claim 1 wherein the encoded encrypted message further contains a bar-code and/or visible color logo.

7. The method of claim 1 wherein applying the encoded message onto the surface of the object is performed in the absence of coloring or varnishing agents or chemical reagents.

8. A method of marking an object to identify same comprising:
   providing a local heating source and
   forming a multi-symbol encoded encrypted message with identification parameters of the object to apply same on a surface of the object impacting the surface by the local heating source,
   said forming being performed by modifying optical properties and structural configuration of the surface to thereby create contrast microscopic imprints thereon comprising cluster nanostructures of elements of material the surface of the object is made of, and
   said forming being computer controlled and carried out according to predetermined impact parameters, the impact parameters being determined as follows:

$$F = \frac{\alpha\beta}{2t_x} + \sqrt{\frac{\alpha^2\beta^2}{4t_x^2} - \frac{\alpha\beta\gamma}{t_x r^2}}, V = \lambda F,$$

where $\alpha = \frac{2Q_{ep}}{\pi r^2 \sqrt{\tau\pi}}$ – local heating source facility parameter, $$\beta = \frac{\eta\sqrt{\gamma}}{K} - \text{processed material parameter;}$$

F—local heating source pulse repetition frequency, Hz;
V—local heating source beam travel speed m/s;
Qcp—medium local heating source radiation power W;
r—local heating source beam imprint radius on the material surface, m;
τ—local heating source pulse duration, s;
η—material absorption coefficient;
γ—material thermal diffusivity, $M^2/s$;
λ—produced color wavelength, m;
K—material thermal conductivity, (W/(m·degree));
$t_x$—phase transition temperature of the object material, °C.

9. The method of claim 8 wherein encoding the encoded encrypted message is performed based on a primary code array of correspondence of each of the symbols of the encoded message to a multibit combination of 0 and 1, the 0 and 1 representing absence and presence of the local heating source impact imprint, and encrypting the encoded encrypted message is effected by creating particular code arrays based on the primary code array by means of random perturbation of the components thereof.

10. The method of claim 8 wherein the encoded encrypted message contains identification information concerning the object, such as technological data (material grade and composition, critical parameters, extreme maintenance conditions etc.), manufacturer's data, production date, etc.

11. The method of claim 8 wherein the identification parameters comprise optical properties of the imprint.

12. The method of claim 8 wherein the local heating source includes a solid-state or fiber laser for marking metals, inorganic and polymer materials.

13. The method of claim 8 wherein the encoded encrypted message further contains a bar-code and/or visible color logo.

14. A method of marking an object to identify same comprising:
providing a local heating source and
forming a multi-symbol encoded encrypted message with identification parameters of the object to apply same on a surface of the object impacting the surface by the local heating source,
said forming being performed by modifying optical properties and structural configuration of the surface to thereby create contrast microscopic imprints thereon comprising cluster nanostructures of elements of material the surface of the object is made of,
encoding the encoded encrypted message being performed based on a primary code array of correspondence of each of the symbols of the encoded message to a multibit combination of 0 and 1, the 0 and 1 representing absence and presence of the local heating source impact imprint;
encrypting the encoded encrypted message being effected by creating particular code arrays based on the primary code array by means of random perturbation of the components thereof, and
said forming being computer controlled and carried out according to predetermined impact parameters, the impact parameters being determined as follows:

$$F = \frac{\alpha\beta}{2t_x} + \sqrt{\frac{\alpha^2\beta^2}{4t_x^2} - \frac{\alpha\beta\gamma}{t_x r^2}}, V = \lambda F,$$

where $\alpha = \frac{2Q_{ep}}{\pi r^2 \sqrt{\tau\pi}}$ – local heating source facility parameter, $$\beta = \frac{\eta\sqrt{\gamma}}{K} - \text{processed material parameter;}$$

F—local heating source pulse repetition frequency, Hz;
V—local heating source beam travel speed m/s;
Qcp—medium local heating source radiation power W;
r—local heating source beam imprint radius on the material surface, m;
τ—local heating source pulse duration, s;
η—material absorption coefficient;
γ—material thermal diffusivity, $M^2/s$;
λ—produced color wavelength, m;
K—material thermal conductivity, (W/(m·degree));
$t_x$—phase transition temperature of the object material, °C.

15. The method of claim 14 wherein the encoded encrypted message contains identification information concerning the object, such as technological data (material grade and composition, critical parameters, extreme maintenance conditions etc.), manufacturer's data, production date, etc.

16. The method of claim 14 wherein the identification parameters comprise optical properties of the imprint.

17. The method of claim 14 wherein the local heating source includes a solid-state or fiber laser for marking metals, inorganic and polymer materials.

18. The method of claim 14, wherein applying the encoded encrypted message onto the surface of the object is effected in the absence of coloring or varnishing agents or chemical reagents.

19. The method of claim 14, wherein the encoded encrypted message further contains a bar-code and/or visible color logo.

20. The method of claim 14, wherein applying the encoded message onto the surface of the object is performed in the absence of coloring or varnishing agents or chemical reagents.

* * * * *